United States Patent [19]

Chisman, III

[11] Patent Number: 4,606,218
[45] Date of Patent: Aug. 19, 1986

[54] COMPACT BIDIRECTIONAL METER PROVER MECHANISM

[75] Inventor: William E. Chisman, III, Houston, Tex.

[73] Assignee: Daniel Industries, Inc., Houston, Tex.

[21] Appl. No.: 691,849

[22] Filed: Jan. 16, 1985

[51] Int. Cl.$^4$ .............................................. G01F 25/00
[52] U.S. Cl. ............................................. 73/3; 73/239
[58] Field of Search ............................. 73/3, 239, 232

[56] References Cited

U.S. PATENT DOCUMENTS

| | | |
|---|---|---|
| 3,120,118 | 2/1964 | Boyle . |
| 3,254,523 | 6/1966 | Fisher et al. . |
| 3,273,375 | 9/1966 | Howe . |
| 3,421,360 | 1/1969 | Luse et al. . |
| 3,457,768 | 7/1969 | Jasek . |
| 3,580,045 | 5/1971 | Pfrehm . |

FOREIGN PATENT DOCUMENTS

| | | | |
|---|---|---|---|
| 2471590 | 6/1981 | France | 73/3 |
| 1420754 | 1/1976 | United Kingdom | 73/3 |
| 2129569 | 5/1984 | United Kingdom | 73/3 |

OTHER PUBLICATIONS

A.P.I. Bulletin.

*Primary Examiner*—Jerry W. Myracle
*Attorney, Agent, or Firm*—Gunn, Lee & Jackson

[57] ABSTRACT

A compact bidirectional meter prover mechanism incorporates a straight calibration barrel having spaced detectors sensing passage of a fluid induced displacer piston. A four-way control valve is connected by flow conduits to the conduit containing the flow meter and is connected by a conduit system to respective extremities of the calibration barrel. Launch valves are interposed between the control valve and the calibration barrel and are selectively positioned to permit metering flow through the calibration barrel only after the control valve has been positioned for directional flow of fluid through the conduit system and the calibration barrel. Thus, the necessity for piston prerun is eliminated and minimum cycle time is permitted. The length of the calibration barrel is also minimized by elimination of piston prerun.

15 Claims, 9 Drawing Figures

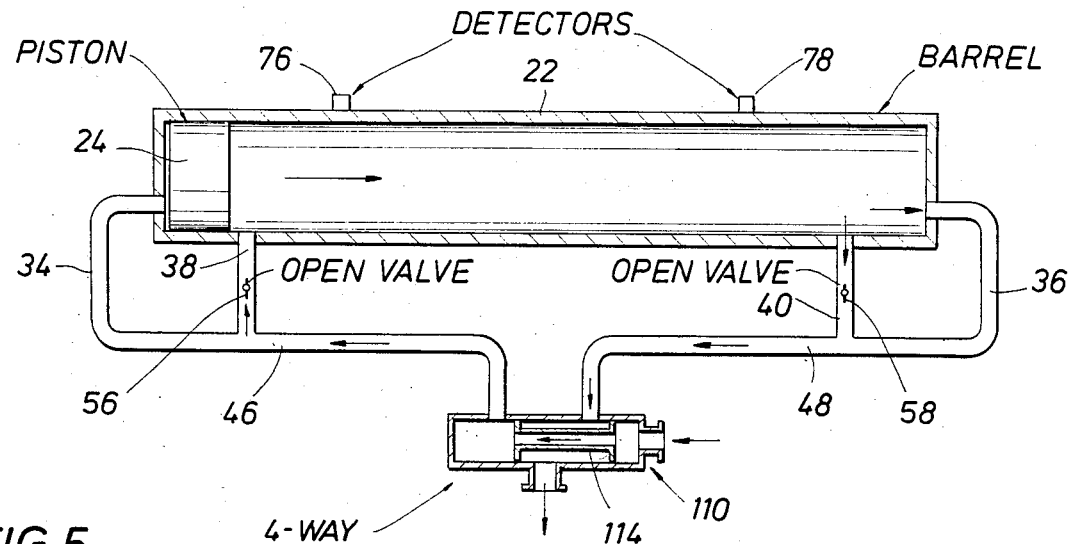
FIG.4 PRE-LAUNCH
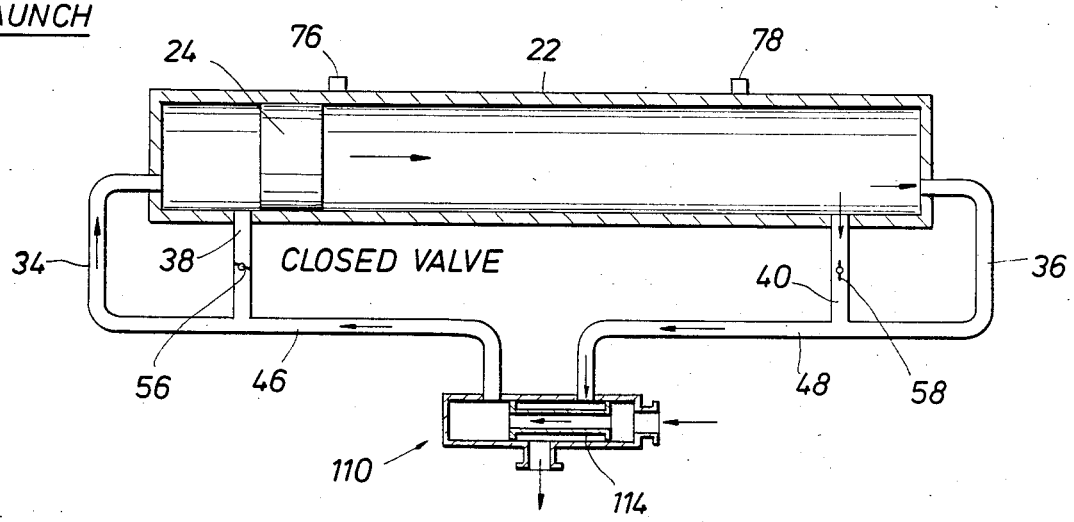
FIG.5 LAUNCH
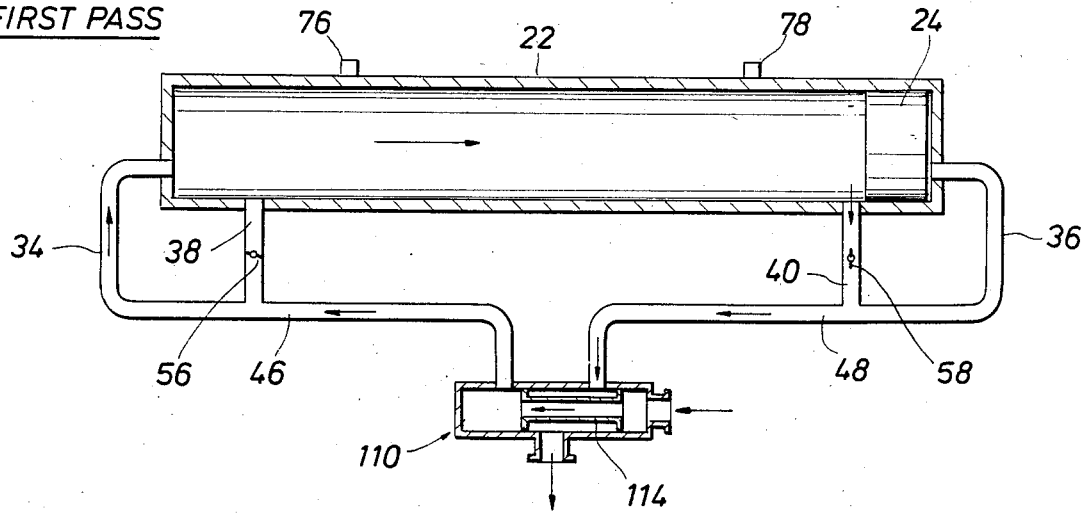
FIG.6 FIRST PASS

PRE-LAUNCH

LAUNCH

SECOND PASS

COMPACT BIDIRECTIONAL METER PROVER MECHANISM

FIELD OF THE INVENTION

This invention relates generally to meter provers and more particularly to bidirectional meter provers such as may be operated by electronic controller systems. Even further, this invention relates to compact bidirectional meter provers of significantly less length as is typically required in bidirectional meter prover systems.

BACKGROUND OF THE INVENTION

Because of the necessity for measuring the flow of fluid such as natural gas, in fluid transmission conduits such as pipelines, various types of flow meters have been devised for such fluid measurements. For example, turbine type flow meters and vortex shedding flow meters are only two examples of many different types of flow meters that have been developed. In order to insure the accuracy of such flow meters, various types of meter provers have been developed which provide for direct comparison of a volume of flowing fluid with a known volume of a calibrated meter prover. If the comparison yields a volumetric differential of zero or an acceptable variation therefrom, the flow meter is then said to be accurate within the limits of allowed tolerances. If the volumetric differential exceeds the limits allowed, then evidence is provided indicating that the flow meter may not be accurate. Flow meter inaccuracy may be temporary such as due to the passage of contaminants through the line or in the alternative, may be of a more permanent nature such as due to flow meter wear, obstruction, etc. In such cases, the flow meter must be removed from the line and repaired or replaced.

Numerous types of meter provers have been developed for verifying the accuracy of flow meters as exemplified by U.S. Pat. Nos. 3,605,810 of Moroney; 3,682,198 of Davis and 3,798,957 of Shannon, et al. Another U.S. patent of interest to this invention is U.S. Pat. No. 3,580,045 of Pfrehm, showing a bidirectional straight barrelled meter prover for cryogenic liquid and which is operated by a four-way spool valve. U.S. Pat. No. 3,254,523 of Fisher, et al. discloses a pulse generating apparatus responsive to piston passage in a bidirectional meter prover. U.S. Pat. No. 3,273,375 of Howe shows a straight type concontric chamber meter prover barrel and a rotary vane type four-way control valve. U.S. Pat. No. 4,419,880 discloses a meter prover having a driven piston which forces a known volume of fluid through a flow meter for volumetric comparison. U.S. Pat. Nos. 3,421,768 of Luse, et al.; 3,457,768 of Jasek and 3,120,118 of Boyle also show straight barrel type bidirectional provers with check valves providing unidirectional flow in certain connecting conduits between the control valve or valves and the calibrated barrel thereof.

To eliminate the necessity for sphere or piston handling devices in meter prover systems, various types of bidirectional meter provers have been developed and used for a considerable period of time. In bidirectional meter provers, a single fluid displacement element such as a piston or sphere is cycled back and forth within a calibrated meter prover barrel having a proving section therein defined by the spacing of a pair of detectors, typically detector switches. A conduit system is employed connecting the meter prover system with a flow line containing the flow meter to be proved. The conduit system incorporates a control valve or valves which control the direction of flow through the calibrated meter prover barrel. By manipulating the control valve to reverse the flow of fluid within the meter prover barrel, the displacer piston can be cycled back and forth within the calibration barrel. During movement of the displacer piston through the barrel, the detector switches are actuated by piston passage providing signals indicating measurement of a precise volume of fluid flow for comparison with the volume detected by the flow meter.

Although bidirectional meter provers have been found quite satisfactorily, nevertheless typical bidirectional provers have various shortcomings which limit their use in some cases. For example, it is sometimes desirable to provide meter provers which are of such small size as to be portable to thus enable a single meter prover system to be utilized for proving out remotely located flow meters. While some bidirectional meter provers have been developed that are sufficiently small as to be portable, the user must typically sacrifice from the standpoint of accuracy and functionality. Portable meter provers of bidirectional character have not heretofore been widely utilized primarily because of the requirement for long calibration barrels to insure desired meter prover accuracy. It is desirable therefore to provide a bidirectional meter prover mechanism which incorporates a meter prover barrel of minimal length and yet which provides the accuracy ordinarily found in bidirectional meter provers having calibration barrels of much longer length.

Most portable meter prover systems that have been developed require a significant amount of manual handling and control in order to insure reasonable accuracy of measurements, thereby causing labor costs to be significantly high as to render such systems noncompetitive and undesirable. It is desirable therefore to provide a compact bidirectional meter prover mechanism which may efficiency operated by an electronic controller with minimal manual handling and control to thus insure minimal labor costs for meter proving activity.

As mentioned above, it is desirable to provide a compact meter prover mechanism with a calibration barrel of minimal length. In most bidirectional meter prover systems, a significant length of meter prover barrel is required to compensate for inaccuracy during valve controlling movement between the flow direction controlling positions thereof. It is desirable therefore to provide a bidirectional meter prover mechanism wherein measuring flow through the calibrated barrel thereof occurs only when the control valve or valves are properly positioned.

If a single valve is employed in the meter prover system, it is typicalldy a four-way valve of either the rotary plug type or of the linear movable spool valve type. Multiple valves may also be employed which are operated simultaneously, or sequentially to reverse the direction of flow in the meter prover barrel. At any rate, the possibility of error in flow measurement during valve operation requires the meter prover barrel to be quite long in conventional bidirectional prover systems.

In conventional bidirectional meter provers, as the control valve begins its flow reversing movement, the displacer piston is immediately launched and begins its movement through the calibration barrel. A length of calibration barrel is provided for piston prerun to thus enable the valve to reach its fully reversed position before the piston member reaches a proving section within the barrel. The proving section is defined by spaced detector devices which detect passage of the piston to and from the proving section and provide appropriate signals to a controller system for processing. The proving section of the calibrated barrel has an accurately determined volume which is utilized electronically for comparison with the volume of flow detected during the same period by the meter being proved. Since the meter prover is bidirectional in character, a length of prover barrel must be provided at each end of the barrel for piston prerun during valve reversing operation. The typical length for a four inch meter prover with a twelve inch barrel is about forty-five feet. With a meter prover barrel of this length and the various lengths of conduit sections for establishing connection between the calibrated barrel and control valve, the entire meter prover system becomes of sufficient size that portability is not ordinarily possible. Therefore, such meter prover systems must be located at static positions and, of course, can accomplish proving only of flow meters located in close proximity thereto. For this reason, bidirectional flow meters are typically located at piping manifolds having multiple flow lines and are provided for selective connection to selected flow lines by valving systems of the manifold.

Various compact, short barrel flow meter provers have been developed in the recent past which can be truck mounted for example for desired portability. The general character of such meter provers is exemplified by an API Bulletin which shows a compact straight barreled meter prover system. In this case, the calibrated barrel is of such length as to provide for a certain length of piston prerun in order to compensate for inaccuracy of measurement during valve controlling movement. Also, bypass spools are provided at each end of the calibrated barrel and check valve controlled conduits control the flow of fluid to and from intermediate portions of the calibrated barrel. Meter provers of this character, though of somewhat compact nature, nevertheless require significantly long meter prover barrels as to render the portability thereof questionable.

SUMMARY OF THE INVENTION

It is a primary feature of the present invention to provide a novel compact bidirectional meter prover system which is of sufficiently compact nature as to be readily portable and yet which maintains the accuracy of conventional bidirectional meter provers.

It is a further feature of this invention to provide a novel compact bidirectional meter prover incorporating a straight meter prover barrel and a conduit system which may incorporate a four-way control valve, a linearly movable spool valve or multiple control valves in order to control piston displacing flow of fluid through the calibrated barrel.

It is an even further feature of this invention to provide a novel compact bidirectional meter prover mechanism and a method of operation thereof which permits piston launching only after complete movement of the control valve or valves to the particular flow reversing operational position thereof.

It is also a feature of this invention to provide a novel compact bidirectional meter prover mechanism incorporating an electronic controller capable of efficiently controlling positioning of the control valve or valves and for selectively positioning launch valves to thus provide for intentional piston launching by the controller.

It is an even further feature of this invention to provide a novel compact meter prover mechanism and method for operation thereof which eliminates the need for piston prerun prior to fluid controlling movement of the piston through the prover section of the calibration barrel.

Briefly, the compact, small volume meter prover of the present invention is a bidirectional piston prover incorporating a straight meter prover barrel having a displacement piston which is moveable within the barrel by directionally controlled flow of fluid. Control of fluid is accomplished by a control valve which may be a four-way control valve of the rotary plug type or linearly movable spool type or which may be provided by plural control valves. To eliminate the need for piston prerun within the calibration barrel, a pair of launch valves are provided which may take any suitable form but, for speed of operation, are typically in the form of butterfly valves. Both the butterfly launch valves and the four-way control valves are automatically moved by an electronic controller in accordance with a double chronometry measurement sequence which eliminates the need for piston prerun prior to movement thereof through the proving section of the calibration thereof. The launch valves are controlled to prevent piston inducing flow of fluid through the calibration barrel until such time as the control valve has reached the position selected by the controller. Thus, upon controlling movement of the launch valves, the piston is immediately launched and immediately enters the proving section of the calibration barrel. There is no variation in fluid flow through the calibration barrel during piston movement because, in each case, the control valve is in its operating position prior to launching of the piston and does not move during piston movement. The particular flow meter arrangement is very organized and compact in appearance, because of the electronically controlled launching and the double chronometry measurement system. The resulting meter prover unit is compact in size, less than one-quarter the size of a comparable ball type meter prover. This allows the meter prover mechanism to be truck or trailer mounted while retaining the proving accuracy of much larger meter provers. The meter prover system has six stages in each of its bidirectional meter prover runs i.e., prelaunch, launch of the piston, first pass of the piston through the proving section, flow reversal, second launch of the piston, and second pass of the piston through the proving section of the calibration barrel. These six stages of meter prover activity insure accuracy of meter prover operation in a meter prover barrel of much shorter length then is ordinarily thought practical in bidirectional meter provers.

The meter prover of the present invention is a small volume prover which combines the proven design of the bidirectional straight type piston prover system together with a current state-of-the-art electronics system and innovations in prover operation and control which facilitates desired accuracy. The result is a rugged and dependable meter prover that is accurate, compact and portable. The prover mechanism may be truck or skid mounted for portability and may be utilized in relatively small spaces such as in the cramped quarters of offshore production platforms, etc.

The meter prover mechanism of this invention also provides for verification of seal integrity of the piston prior to each piston launching operation. Simultaneously, the seal integrity of the four-way valve is also verified at each of its flow controlling positions. Signals of seal integrity or seal leakage are provided at each operational sequence to the electronic controller, thereby providing the controller with the capability of accepting or rejecting meter prover measurements for comparison with flow meter measurements.

BRIEF DESCRIPTION OF THE DRAWINGS

So that the manner in which the above-recited features, advantages and objects of the invention, as well as others which will become apparent, are attained and can be understood in detail, a more particular description of the invention, briefly summarized above, may be had by reference to the embodiments thereof that are illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

FIG. 4 is a schematic illustration of a compact meter prover mechanism according to the present invention and showing a spool type control valve and butterfly type launch valves in the prelaunch positions thereof FIG. 5 is a schematic illustration similar to that of FIG. 4 showing the control valve and launch valves in the launch positions thereof and showing piston movement from the prelaunch position toward the opposite extremity of the calibration barrel;

FIG. 6 is a similar schematic illustration of a compact bidirectional meter prover according to this invention showing the control valve and launch valves in the positions thereof during first pass of the piston and with the piston shown in its position after completion of its movement during its first pass through the proving section and to the end of the barrel;

DETAILED DESCRIPTION OF THE PREFERRED EMBODIMENT

Figure 1:
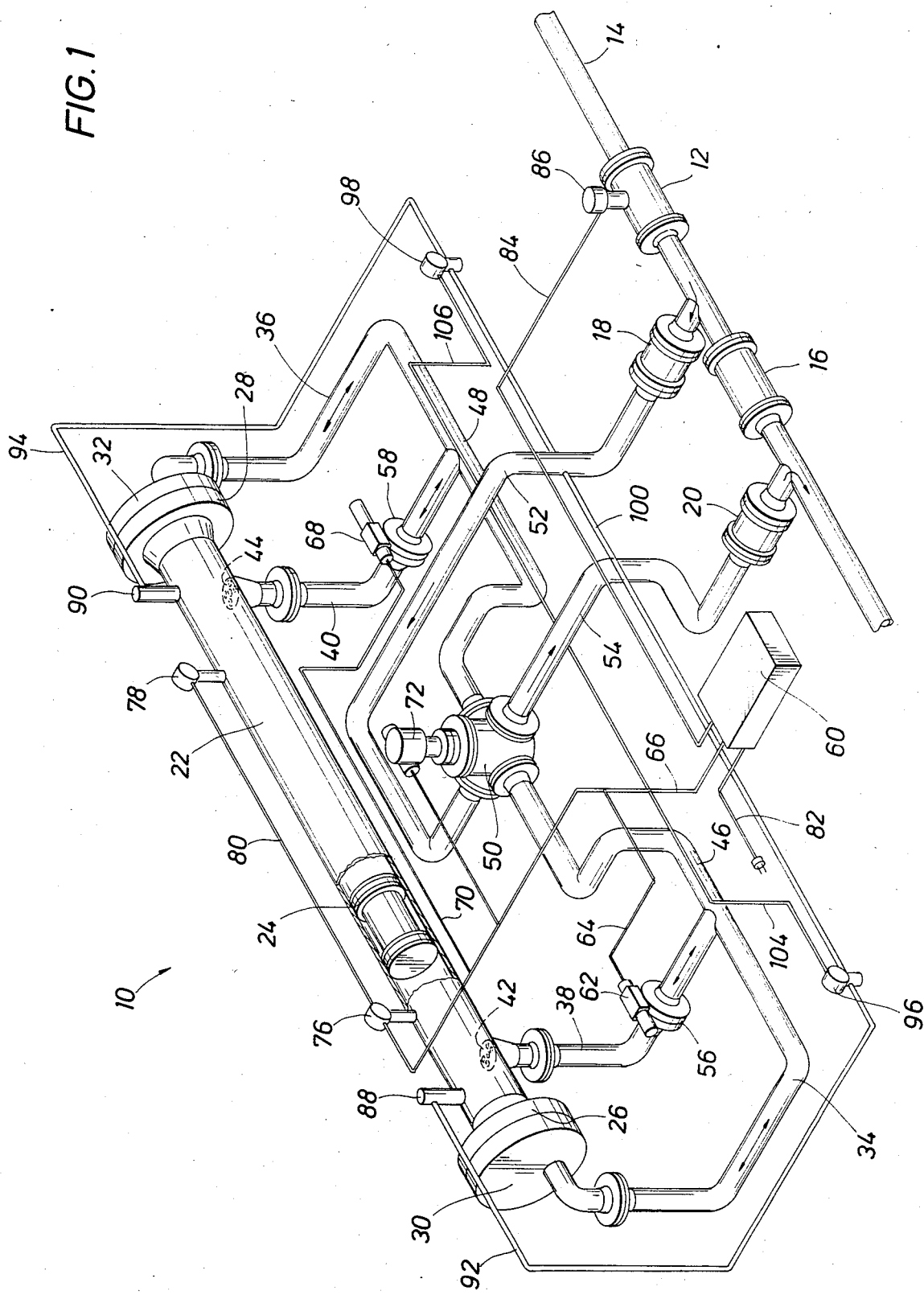
FIG. 1 is an isometric view of a compact small volume meter prover constructed in accordance with the present invention and utilizing a rotary plug type four-way control valve and showing in broken line a displacer piston during movement thereof within the proving section of the calibration barrel and further showing an electronic control system in operative communication with the meter prover mechanism for cyclical operation thereof.

Referring now to the drawings and first to FIG. 1, a compact bidirectional meter prover according to the present invention is illustrated generally at 10 and is provided for the purpose of verifying the accuracy of a flow meter 12 connected in a flow line 14. A typical connection for meter provers to flow lines is shown in the figure with a block valve 16 connected into the flow line 14 and with prover connection block valves 18 and 20 provided for controlling communication of the flow line with the meter prover conduit system. For operation of the meter prover, the block valve 16 will be closed and block valves 18 and 20 will be opened thereby causing flow from the flow line 14 through the meter prover system and back to the flow line by an opened valve 20. When meter prover operation is not desired, of course, the block valve 16 will be open and meter prover block valves 18 and 20 will be closed.

The meter prover mechanism 10 incorporates an elongated calibration barrel 22 within which is movably disposed a displacer piston member 24 having piston seals at each end thereof. Respective extremities of the calibration barrel are provided with connection flanges 26 and 28 receiving spool connection plates 30 and 32 having bypass spool conduits 34 and 36 connected thereto. At positions spaced from the respective ends of the calibration barrel 22, piston launch conduits 38 and 40 are connected to the cylindrical wall portions of the calibration barrel such as at openings 42 and 44 respectively.

The bypass spool conduits and piston launch conduits are each disposed in communication with manifold conduits 46 and 48 which are communicated with respective openings of a four-way control valve 50. A fluid supply line 52 and a fluid return line 54 are in communication with block valves 18 and 20 and with respective openings of the control valve 50. Depending upon the position of the valve element within the control valve 50, the flow in piston launch conduits 38 and 40 and bypass spool conduits 34 and 36 will be directionally controlled as shown by double ended flow arrows, thus consequently controlling the direction of fluid flow through the elongated calibration barrel 22 for directionally controlled movement of the displacer piston within the calibration barrel.

It is desirable to minimize the length of the elongated calibration barrel 22 by eliminating the need for displacer piston prerun before entry of the displacer piston into the proving section of the calibration barrel. To accomplish this purpose, a pair of piston launch valves 56 and 58 are provided in the respective piston launch conduits 38 and 40. The launch valves are selectively controlled in concert with the control valve 50 to insure that piston displacing flow of fluid within the calibration barrel 22 does not occur until such time as the control valve has completed its movement to the position selected by the electronic controller system 60. The launch valve 56 is provided with a valve actuator 62 which is electrically coupled by electrical control lines 64 and 66 to the controller. Likewise, launch valve 58 is provided with a valve actuator 68 which is coupled by electrical control line 70 and line 66 to the controller.

The control valve 50 is provided with a valve actuator 72 for its operation which is controlled via electrical control conduit 74 and conduit 66 which connect it to the controller 60. It should be born in mind that the various electrical control conduits described above merely provide schematic indications that control an operation of the launch valves and the control valve are controlled electronically by the controller 60. The specific electrical lines for purposes of control and operation of the valve actuators and other components are not shown individually to facilitate ease of understanding.

The elongated calibration barrel 22 is provided with piston detector means such as detector switches 76 and 78 which are innerconnected by electrical control conduits 80 and 66 to the electronic controller. The piston detector switches 76 and 78 include portions within the calibration barrel 22 which are engaged by the piston member 24 to provide mechanical signals indicating piston passage. The mechanical signals are converted to electrical signals by appropriate transducers and these signals are provided through electrical conductors to the electronic controller. The space between piston detector switches 76 and 78 identifies the "proving section" of the calibration barrel. The electronic controller 60 is provided with a power supply line 82 for connection to any suitable source of electrical energy. Another electrical conductor 84 communicates the circuitry of the electronic controller 60 with a flow meter transducer 86 providing electrical signals responsive to flow meter movement induced by the flow of fluid through the flow line 14.

In order to insure the accuracy of meter prover flow measurement, it is desirable to insure that the sealing elements of the displacer piston 24 achieve proper sealing with the inner wall surface of the calibration barrel. In some cases, the seals of the piston may be caused to leak on a temporary basis by contaminant inference such as by line scale, sand or any other foreign matter contained within the fluid handled by the flow line. In other cases, the seals of the displacer piston may begin to leak as the result of seal wear or damage that occurs during operation of the meter prover system. In the event piston seal leakage should occur for any reason whatever, the measurement accomplished by the meter prover may be considered inaccurate and thus may need to be eliminated. The controller circuitry is capable of automatically deleting any meter prover measurements which have a possibility of error.

For piston seal verification, a pair of seal detectors 88 and 90 are connected to the calibration barrel and have pressure lines 92 and 94 connected therewith which are in communication with the inner chamber of the calibration barrel. The pressure lines 92 and 94 are in turn communicated with differential pressure transducers 96 and 98 to thereby conduct fluid pressure from within the calibration barrel to the respective differential pressure switches. Pressure lines 100 and 102 are in communication with the fluid supply line 52 and are also in communication with the differential pressure switches 96 and 98. The differential pressure switches therefore are capable of providing electrical signals representing to the difference in pressure between line pressure and pressure within the end portions of the calibration barrel. When the piston member is located at the ends of the barrel, its sealing assemblies may be inspected for verification of proper sealing.

The lengths of the calibration barrel between launch conduit openings 42 and 44 and respective end walls or end portions of the calibration barrel defined piston receptacles. When the displacer piston 24 has moved past the respective openings 42 and 44 into either of the piston receptacles, piston seal verification can occur. Seal verification connectors 88 and 90 communicate the lines 92 and 94 with the annular space defined between the sealing members at each end of the displacer piston. The piston seal verification mechanisms 88 and 90 are capable of inducing a lower pressure in the annular space between the sealing members of the displacer piston as compared to the pressure within the remaining portion of the calibration barrel. This low pressure condition is communicated by lines 92 or 94 with the respective differential pressure switches 96 or 98. Thus, an electrical signal representing the differential between line pressure and such lower pressure is communicated electrically by via electrical lines 104 and 106 to electrical lines 66 of the controller 60. If the differential pressure received by the controller circuitry remains stable, evidence is provided that the sealing elements of the displacer piston are not leaking and therefore the subsequent measurement cycle of the displacer piston will be proper. In the event a differential pressure is not established, or if established, begins to change, then evidence is provided that the displacer piston is not maintaining a proper seal with the calibration barrel. In this case, the electronic controller will delete at least one succeeding cycle of flow measurement.

Although not shown in FIG. 1, the control valve 50 may also be provided with means for verifying the sealing integrity of the internal sealing elements thereof. By insuring the sealing integrity of the sealing elements of both the displacer piston and the control valve, evidence of optimum, accurate flow measurement is thereby provided.

As mentioned above, the minimal length of the elongated calibration barrel 22 is due to elimination of the need for piston prerun prior to entry of the piston into the proving section defined between the piston detector switches 76 and 78. Piston prerun is eliminated because the launch valves 62 and 68, which may conveniently take the form of butterfly valves for example, are positioned by the circuitry of the electronic controller so that piston launching and moving flow of fluid within the calibration barrel will not occur until such time as the control 50 has fully reached its proper flow controlling position. When flow occurs through the control valve 50 therefore it is at the same volume of flow as that of the flow line 14 and is not restricted flow or improperly channeled flow which would otherwise occur during flow reversal movement of the valve mechanism. The operational sequences of the launch valves and the control valve are discussed hereinbelow particularly in connection with the schematic illustrations of FIGS. 4-9.

Figure 2:
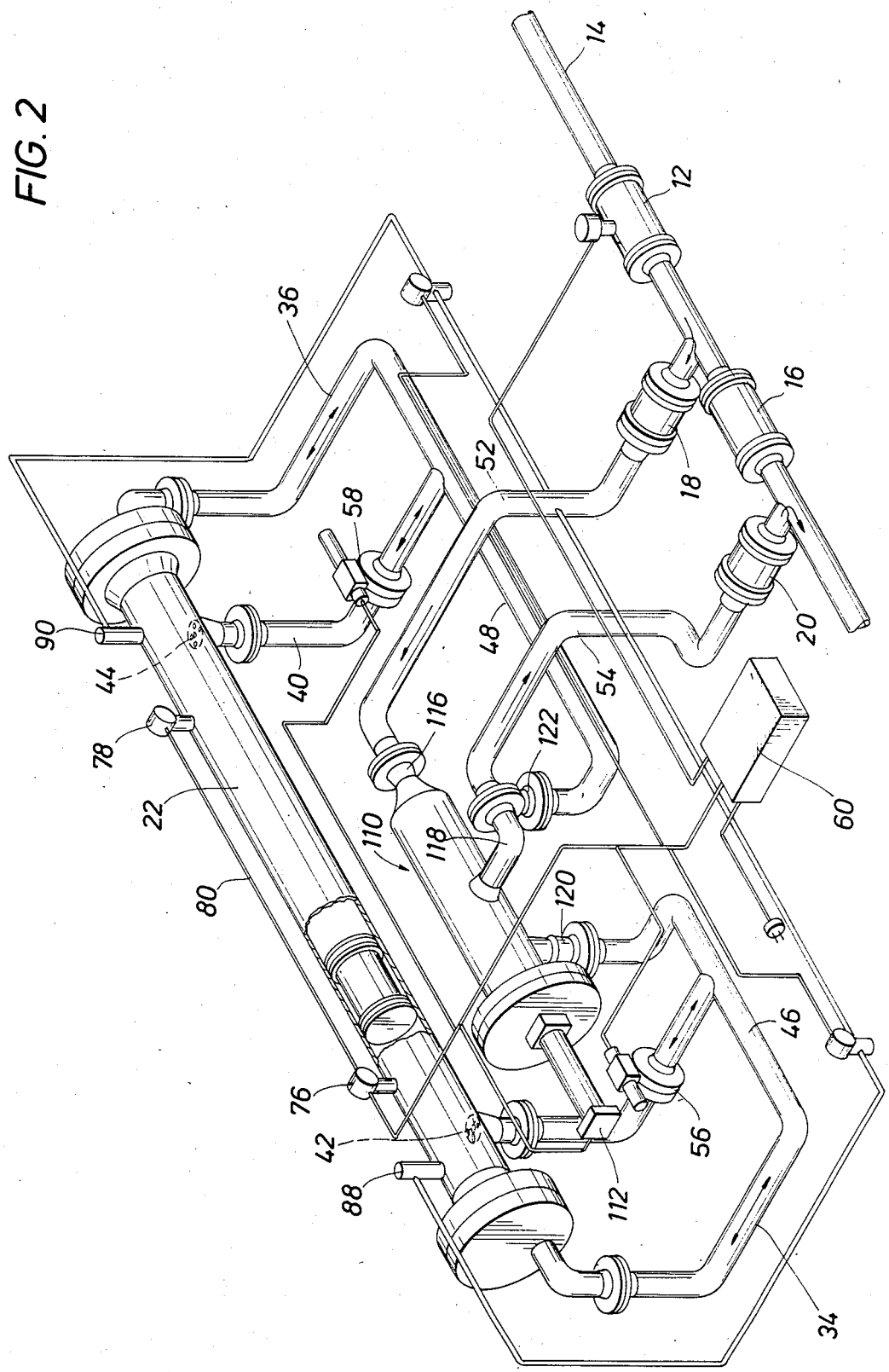
FIG. 2 is an isometric view of a compact meter prover mechanism constructed in accordance with the present invention and being similar to that of FIG. 1 and showing a linearly movable four-way spool valve for controlling the direction of fluid flow through the calibrated barrel.

Referring now to FIG. 2, wherein like reference numerals represent like parts, a control valve is provided as shown generally at 110 which is in the form an elongated spool valve mechanism capable of reversing fluid flow within the calibration barrel upon linear movement of an internal valve spool assembly. For details of the spool type control valve 110 reference may be had to copending application Ser. No. 06/685,832 of Daniel E. Russell, filed Dec. 24, 1984 and commonly assigned herewith. Instead of a valve actuator capable of inducing rotary movement as in the case of valve actuator 72 in FIG. 1, a valve actuator 112 is provided which is in the form a linear fluid motor capable of inducing linear movement to an internal spool assembly within the spool valve 110. The internal spool assembly is illustrated schematically at 114 in FIGS. 4–9. The spool valve incorporates an inlet portion 116 connected to inlet conduit 52 of the meter prover and an outlet connection 118 for connection with return conduit 54. The valve 110 is provided with prover connections 120 and 122 which are connected respectively to manifold conduits 46 and 48. Again, although not shown in FIG. 3 for the purpose of simplicity, the spool type control valve 110 will also incorporate an internal seal verification system as is clearly set forth and described in co-pending patent application Ser. No. 06/685,832.

Figure 3:
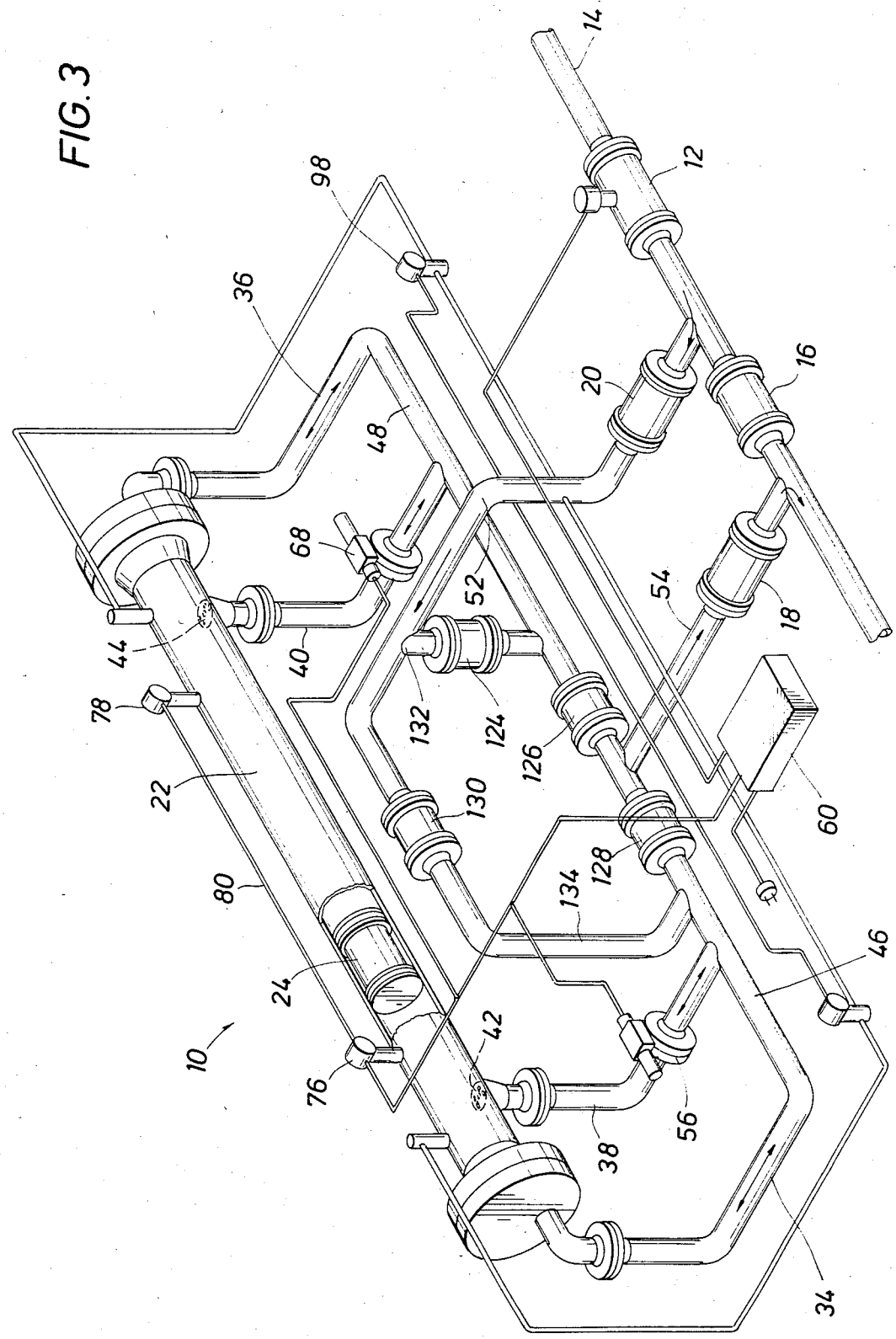
FIG. 3 is a similar isometric view of a compact meter prover mechanism constructed in accordance with this invention and showing a plurality control valves for controlling the direction of fluid flow through the calibrated barrel.

Referring now to FIG. 3 wherein like reference numerals also represent like parts, the control of flow through the elongated calibration barrel 22 is caused by a plurality of control valves 124, 126, 128 and 130. The inlet conduit 52 is connected with a "T" fitting 132 connecting control valve 124 with manifold conduit 48. Likewise, control valve 126 is connected with manifold conduit 48 and with fluid return conduit 54. Control valve 128 is also in communication with the fluid return conduit and with the manifold conduit 46. Control valve 130 is connected to the flow inlet conduit 52 and with manifold conduit 46 via a conduit 134. Although not shown in the drawings, for electronic control, each of the control valves 124, 126, 128 and 130 would be provided with valve actuators which in turn would be coupled for control and operation with the circuitry of the controller 60. The open and closed positions of the control valves would be appropriately established by the electronic controller 60 to induce the direction of flow in the respective piston launch conduits 38 and 40 and bypass spool conduits 34 and 36. When this occurs, the displacer piston will be selectively moved from its launch position through the calibrated prover barrel to the opposite piston receptacle past the appropriate launch opening within the calibrated barrel.

Referring now to FIGS. 4–9, an operational sequence is illustrated schematically showing cycling movement of the meter prover mechanism responsive to controlling positioning of an internal spool assembly 114 of the spool type control valve 110. In these figures, like reference characters correspond to like parts in FIGS. 1–3. As shown in FIG. 4, the meter prover mechanism is disposed in its prelaunch condition with the valve spool member 114 positioned to induce clockwise circulation of fluid flow through the meter prover mechanism, causing flow through the calibration barrel to be toward the right as shown in FIG. 4. In a prelaunch condition, the launch valves 56 and 58 are both open thereby allowing directional flow as shown by the flow arrows. Fluid flow entering the spool valve 110, passes through the elongated internal passage of the spool assembly and then esters the manifold conduit 46. With piston launch valve 56 open, fluid flow occurs through launch conduit 38 into the meter prover barrel downstream of the displacer piston 24. Thus the displacer piston will remain in its piston receptacle by virtue of friction between the piston seals and the inner wall surface of the calibration barrel. Due to the path of least resistance, fluid will flow through launch conduit 38 into the calibration barrel and will exit the calibration barrel through launch conduit 40 and bypass spool conduit 36 because the launch valve 58 will also be in its open position.

Without any movement of the spool assembly 114, of the spool valve as shown in FIG. 5, upon an appropriate signals from the elctronic controller, the valve actuator 62 will cause closure of launch valve 56 thus causing all flow from the manifold conduit 46 to pass through the bypass spool conduit 34 and into the extreme end portion of the calibration barrel 22. Thus, the displacer piston 24 is launched immediately upon closure of the launch valve 56 and thereby begins its fluid induced movement from the position shown in FIG. 4 toward the piston position shown in FIG. 6.

After the displacer piston has moved sufficiently to clear the opening 42, the launch valve 56 may be opened since flow through launch conduit 38 at this point will also induce piston movement toward the opposite extremity of the calibration barrel. The controller circuitry may therefore be set to either open the launch valve 56 immediately upon passage of the piston past the opening 42 or it may be set to maintain the valve closed until such time as flow reversal is desired. For example, as shown in FIG. 6, the launch valve 56 has been allowed to remain closed until completion of the first pass of the displacer piston past the detector switches 76 and 78 to the opposite extremity of the calibration barrel. The meter prover mechanism will be in the position shown in FIG. 6 after completion of the first metering pass and will then be ready for a second pass in the opposite direction through the calibration barrel 22. The launch valve 56 may be open or closed as desired after completion of the first pass.

Figure 7:
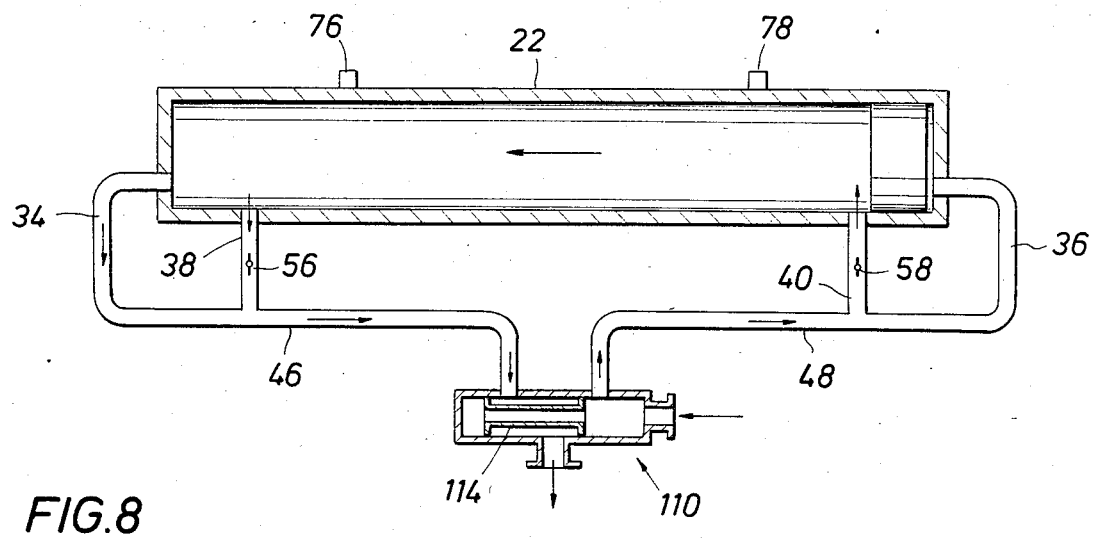
FIG. 7 is a schematic illustration showing the control valve in its shifted flow reversing position and further showing the launch valves in the prelaunch positions thereof.

As shown in FIG. 7, the meter prover mechanism is repositioned to a prelaunch state from the position shown in FIG. 6 with both launch valves 56 and 58 open and with the displacer piston 24 in the piston receptacle at the right hand portion of the elongated calibration barrel 22. The spool assembly of the spool valve 110 is shifted to its opposite position as shown. When this occurs, fluid flow in the manifold conduits is reversed as shown in the flow arrows. In this case, however, with launch valves 56 and 58 both open, the displacer piston 24 will remain statically positioned within its receptacle in the calibration barrel and fluid flow from manifold 48 will enter the calibration barrel via launch conduit 40. Launch valve 56 will also be opene in this case and fluid flow exits the calibration barrel via both the bypass spool conduit 34 and the piston launch conduit 38.

Figure 8:
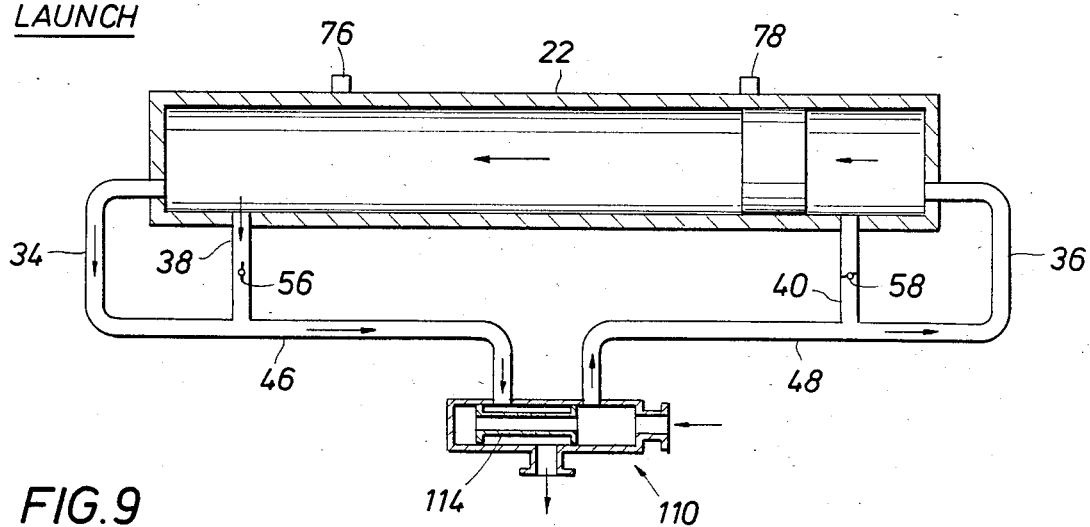
FIG. 8 is a similar schematic illustration showing the launch valves in the launch positions thereof and showing the piston member having been launched and in its second pass traverse of the calibration barrel.
Figure 9:
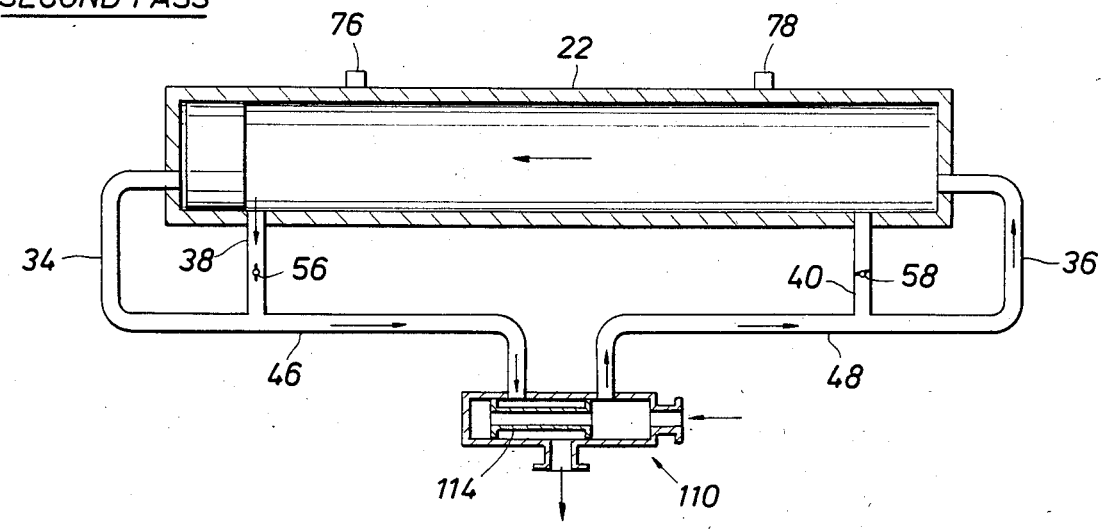
FIG. 9 is a schematic illustration similar to that of FIGS. 7 and 8 showing the launch valves and displacer piston in the positions thereof after having completed the second pass through the calibration barrel.

The second launch of the displacer piston occurs as shown in FIG. 8 upon selective closure of the launch valve 58 by its valve actuator in response to appropriate energization by the electronic controller 60. The opposite launch valve 56 is allowed to remain open. When the launch valve 58 is closed, fluid flow into the calibration barrel continues via bypass loop conduit 36. Immediately upon closure of the launch valve 58 by the controller, the displacer piston 24 is launched and begins its second pass movement through the calibration barrel and to the terminal piston position shown in FIG. 9. During the second pass movement of the displacer piston, it contacts the spaced detectors 78 and 76 defining the proving section of the calibrated barrel to reflect the flow of a measured volume of fluid. After the displacer piston has reached the position shown in FIG. 9, further flow through bypass spool conduit 34 will cease and, since the piston launch valve will be open, flow will continue through launch conduit 38 to the manifold conduit 46 to the spool valve and flowing through the spool valve to the return line as shown by flow arrows. Again, the launch valve 58 may remain closed during movement of the displacer piston through the calibration barrel to the position shown in FIG. 9. In the alternative, however, after movement of the displacer piston past the opening 44, as shown in FIG. 8, the launch valve 58 may be immediately opened by the controller thereby allowing flow of fluid from the spool to enter the calibration barrel via both the launch conduit 40 and the bypass spool conduit 36.

It is thus clear from the foregoing disclosure that immediate launching of the piston occurs upon selective operation of the launch valves responsive to controlled energization of the electronic controller system with which the meter prover system is equipped. The launch valves will be caused to remain in positions where flow through the calibration barrel does not indure piston movement until such time as the control valve mechanism has been completely moved to its flow reversing position. Thus, there is no necessity for providing any significant length of calibration barrel for piston prerun before the piston reaches the proving section of the calibration barrel. When the launch valve is operated to launch, the piston volume of flow through the calibration barrel will be identical to the volume of flow through the flow line containing the flow meter to be proved. The calibration barrel may therefore be of quite minimal length as compared to the long lengths of prover barrel that are ordinarily required for bidirectional proving.

During the phases of the cycle when the displacer piston is positioned within the appropriate receptacles at the end portions of the calibration barrel, such as during control valve movement, the sealing integrity of the sealing elements of the displacer piston are verified by means of differential pressure detection. With appropriate signals being provided to the electronic controller to insure that subsequent piston movement through the calibration barrel may be taken as a valid proving cycle. If piston seal leakage is detected, the electronic controller will delete the subsequent proving cycle and will thereby provide effectively accurate meter proving activity since only valid meter prover cycles will be totalized and processed by the electronic controller. It is therefore seen that this invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A bidirectional compact meter prover mechanism for connection to a flow line incorporating a flow meter, comprising:
(a) a straight elongated calibration barrel having a displacer piston longitudinally movable therein, said calibration barrel having first and second closed end walls each forming bypass openings, said calibration barrel forming launch openings near each end thereof in spaced relation with said end walls and forming piston receptacles between said launch openings and said end walls;
(b) detector means provided near each extremity of said elongated calibration barrel for detecting movement of said displacer piston toward each extremity of said elongated calibration barrel, said detector means establishing a proving section within said elongated calibration barrel and between said launch openings;
(c) conduit means for conducting fluid flow passing through said flow meter to said elongated calibration barrel;
(d) control valve means being interconnected with said conduit means and being selectively positionable to control the direction of fluid flow through said elongated calibration barrel, said fluid flow inducing movement of said displacer piston within said elongated calibration barrel;
(e) a pair of manifold conduits being coupled with said control valve means;
(f) a pair of launch conduits each coupled with respective launch openings and with respective manifold conduits;
(g) a pair of bypass conduits each coupled with respective bypass openings and respective manifold conduits;
(h) a pair of butterfly type piston launch valves being respectively interconnected in said launch conduits;
(i) first valve operator means controlling opening and closing of said piston launch valves;
(j) second valve operator means controlling positioning of said control valve means; and
(k) control means accomplishing selective energization of said first and second valve operator means to achieve selective positioning of said control valve means prior to selective positioning of said piston launch valves, said displacer piston being launched toward the opposite extremity of said elongated calibration barrel upon controlled operation of said piston launch valves.

2. A bidirectional compact meter prover mechanism as recited in claim 1, wherein:
said elongated calibration barrel, between connections thereof with said launch conduit means and bypass conduit means, forming terminal receptacles for said displacer piston.

3. A bidirectional compact meter prover mechanism as recited in claim 2, wherein:
(a) said displacer piston includes spaced sealing means having sealing engagement with said elongated calibration barrel; and
(b) said seal verification means at each extremity of said elongated calibration barrel is located to inspect the sealing integrity of said spaced sealing elements when said displacer piston is located within each of said terminal receptacles.

4. A bidirectional compact meter prover mechanism as recited in claim 1, including:
seal verification means at each extremity of said elongated calibration barrel verifying the sealing integrity of said displacer piston relative to said elongated calibration barrel prior to each launch of said displacer piston.

5. A bidirectional compact meter prover mechanism as recited in claim 4, wherein:
(a) said displacer piston includes pairs of sealing elements at each extremity thereof positioned in spaced relation and defining an annular space therebetween, said sealing elements each establishing sealing engagement with said elongated calibration barrel; and (b) said seal verification means selectively establishing a verification fluid pressure in at least one of said annular spaces at each static position of said displacer piston within said elongated calibration barrel, said verification fluid pressure being different than the line pressure of fluid within said elongated calibration barrel, said seal verification means detecting the pressure differential of said verification fluid pressure and said line pressure and responding to any change in said pressure differential to delete the succeeding meter calibration cycle as erroneous due to seal leakage.

6. A method of operating a bidirectional meter prover having an elongated calibration barrel having end walls and forming piston receptacles at each end thereof and a displacer piston movably disposed therein, four way control valve means for controlling the direction of fluid flow through said elongated calibration barrel: (a) a pair of manifold conduits being coupled with said control valve means, a pair of launch conduits each coupled with respective launch openings and with respective manifold conduits, a pair of bypass conduits each coupled with respective bypass openings and respective manifold conduits and butterfly type piston launch valve means in said launch conduit, comprising:

(a) positioning said launch valve means to permit flow through one of said launch conduits through said calibration barrel and through one of said bypass conduits to said control valve with said displacer piston positioned in one of said piston receptacles thus preventing piston movement within said elongated calibration barrel;

(b) establishing selective positioning of said four way control valve means for directional fluid flow in said elongated calibration barrel for fluid induced piston movement from one end of said elongated calibration barrel toward the opposite end thereof; and (c) after completion of said selective positioning of said four way control valve means, moving said launch valve means to positions permitting flow of fluid through said control valves means and through the bypass conduit communicating with said one of said piston receptacles thus launching said displacer piston toward the opposite end of said elongated calibration barrel with flow being through said elongated calibration barrel and through both the opposite ones of said bypass conduits and launch conduits to said control valve.

7. A method as recited in claim 6 wherein said launch valve means comprises two butterfly type valves controlling flow of fluid to and from respective ends of said elongated calibration barrel and bypass spool means communicates said control valve means with respective extremities of said elongated calibration barrel and operational cycling of said bidirectional meter prover comprises:

(a) with said control valve means in a preselected position permitting directionally oriented flow through said elongated calibration barrel, moving said launch valves to prelaunch positions preventing flow of fluid through said bypass spool means and permitting flow of fluid through said elongated calibration barrel;

(b) with said control valve means in said preselected position, moving said launch valves to a first launch position permitting the flow of fluid from said control valve means through said bypass spool means for fluid induced piston movement from one end of said elongated calibration barrel to the opposite end thereof;

(c) upon completion of said fluid induced piston movement, movement and with said launch valves in sid prelaunch positions, positioning said control valve means to reverse the direction of fluid flow through said elongated calibration barrel; and (d) moving said launch valves to a second launch position permitting flow of fluid through said control valve means and the other of said bypass spool means for fluid induced movement of said piston means through said elongated calibration barrel in the opposite direction.

8. A method as recited in claim 7, wherein:

(a) said launch valves are open at said prelaunch positions thereof;

(b) at said first launch position one of said launch valves is closed and the other of said launch valves is open;

(c) at said second prelaunch position said launch valves are open; and (d) at said second launch position said one of said launch valves is open and said other of said launch valves is closed.

9. A method as recited in claim 8, wherein respective launch conduits communicate with control valve with respective end portions of said elongated calibration barrel at connections remote from the respective ends of said elongated calibration barrel and said launch valves are interposed in respective launch conduits, said method including:

opening the respective closed launch valve after passage of said piston past the launch conduit connection thereof with said elongated calibration barrel and prior to arrival of said piston at the opposite end of said elongated calibration barrel.

10. A method as recited in claim 8, wherein respective launch conduits communicate with control valve with respective end portions of said elongated calibration barrel at connections remote from the respective ends of said elongated calibration barrel and said launch valves are interposed in respective launched conduits, said method including:

positioning said launch valves at said prelaunch positions thereof after movement of said piston past said launch conduit connection thereof with said elongated calibration barrel and prior to arrival of said piston at the opposite end of said elongated calibration barrel.

11. A method as recited in claim 8, wherein respective launch conduits communicate with control valve with respective end portions of said elongated calibration barrel at connections remote from the respective ends of said elongated calibration barrel and said launch valves are interposed in respective launch conduits, said method including:

opening said closed launch valve after arrival of said piston at said opposite end of said elongated calibration barrel and prior to movement of said control valve means to the opposite position thereof.

12. A method of operating a bidirectional meter prover having an elongated calibration barrel defining first and second extremities and having a pair of spaced piston detector elements defining a proving section between said first and second extremities and a piston member movable within said elongated calibrated barrel; control valve mens in communication with a flow conduit containing a flow meter to be provided; a pair of piston launch conduits in communication with said elongated calibration barrel at locations between respective first and second extremities of said elongated calibration barrel and respective piston detector means; a pair of launch valves selectively controlling flow through said launch conduits; bypass conduits communicating respective extremities of said elongated calibration barrel with said control valve means; and means for selectively controlling positioning of control valve means and said launch valves in accordance with an operational sequence; said method comprising:

(a) positioning said control valve at a first position with said launch valves open permitting nonpiston moving flow of fluid through said elongated calibration barrel and with said piston member positioned at a first end of said elongated calibration barrel;

(b) closing a first one of said launch valves causing cessation of flow through a first one of said piston launch conduits and causing flow through a first one of said bypass spool conduits, said flow launching said piston member for movement to the second end of said elongated calibration barrel;

(c) opening said first one of said piston launch valves permitting flow from said elongated calibration barrel through the second one of said launch conduits, said piston member blocking flow through the second one of said bypass spool conduits;

(d) moving said control valve to the second position thereof reversing the direction of fluid flow to and through said elongated calibration barrel, said piston launch valves both being open permitting non piston-moving flow through said elongated calibration barrel and with said piston member located at the second end of said elongated calibration barrel; and (e) closing a second one of said piston launch valves causing cessation of flow thorugh a second one of said launch conduits and causing flow through a second one of said bypass spool conduits thus launching said piston member for fluid induced movement from said second end of said elongated calibration barrel to said first end thereof.

13. The method of claim 12, wherein:

said step of opening said first one of said piston launch valves occurs after said piston member has been moved from said first end of said elongated calibration barrel past the connection of said first one of said piston launch conduits with said elongated calibration barrel.

14. The method of claim 13, wherein:

said step of opening said second one of said piston launch valves occurs after said piston member has been moved from said second end.

15. The method of claim 12, wherein:

prior to said closing of either of said first and second piston launch valves, said control valve ceasing its controlled movement to the respective one of its first and second positions.

* * * * *